United States Patent [19]

Yamashita et al.

[11] Patent Number: 5,564,014

[45] Date of Patent: Oct. 8, 1996

[54] APPARATUS/METHOD FOR ERROR DETECTING AND RETRYING INDIVIDUAL OPERANDS OF AN INSTRUCTION

[75] Inventors: Hideo Yamashita; Shigeharu Matsuzaki, both of Kawasaki, Japan

[73] Assignee: Fujitsu Limited, Kawasaki, Japan

[21] Appl. No.: 296,250

[22] Filed: Aug. 25, 1994

[30] Foreign Application Priority Data

Nov. 19, 1993 [JP] Japan .................................. 5-290447

[51] Int. Cl.$^6$ .................................................. G06F 11/00
[52] U.S. Cl. .................................. 395/182.15; 395/185.02
[58] Field of Search ............................ 371/12; 395/575, 395/182.15, 182.13, 182.14, 184.01, 185.01, 185.02

[56] References Cited

U.S. PATENT DOCUMENTS

| | | | |
|---|---|---|---|
| 3,533,065 | 9/1972 | McGilvray et al. | 340/172.5 |
| 3,533,082 | 10/1970 | Schnabel et al. | 340/172.5 |
| 3,618,042 | 11/1971 | Miki et al. | 340/172.5 |
| 4,045,661 | 8/1977 | Antoine et al. | 235/153 |
| 5,151,987 | 9/1992 | Abraham et al. | 395/575 |
| 5,321,698 | 6/1994 | Nguyen et al. | 371/12 |
| 5,371,884 | 12/1994 | Ross | 395/575 |

*Primary Examiner*—Robert W. Beausoliel, Jr.
*Assistant Examiner*—Norman M. Wright
*Attorney, Agent, or Firm*—Staas & Halsey

[57] ABSTRACT

An apparatus for controlling a command retry widens an applied range of a retry function in an information processor for executing a program under pipeline control and aiding reliability, availability and serviceability of the information processor. The command retry control apparatus translates an instruction contained in the program into commands in a processable form and executes the processing on a command basis. The command retry control apparatus determines, if an error occurs during the execution of the command, whether or not an operand value is a normal value and executes, when the operand value is the normal value, a command retry by stopping inputting a next command. The command retry control apparatus continues the processing by resuming the inputting of the next command when normally finishing the command retry. If the error reoccurs in the middle of the command retry, the command retry control apparatus decides that the command is unexecutable and notifies a management system of the occurrence of the error.

8 Claims, 8 Drawing Sheets

APPARATUS/METHOD FOR ERROR DETECTING AND RETRYING INDIVIDUAL OPERANDS OF AN INSTRUCTION

BACKGROUND OF THE INVENTION

The present invention relates to a method of and an apparatus for controlling a command retry when detecting a hard error during command processing in an information processor for performing the processing under pipeline control.

An advancement of techniques pertaining to information processing has been remarkable in recent years. With this advancement, a variety of services have been offered.

Take enterprises, for instance, a commercial goods stock management, a personnel working management, an accounting management and a transaction information management which are performed by general-purpose computer-based information processors. If a system failure of the information processor is caused, its influence will be exerted on not only the enterprise concerned but also other related enterprises. Accordingly, it is of importance that the information processor be constructed in consideration of improving RAS (Reliability Availability Serviceability) as well as improving a processing speed at a stage of designing the processor.

A method of actualizing this RAS is exemplified by a data parity check, ECC (Error Check and Correction) of a CS (Control Storage) and an instruction retry when an error happens.

FIG. 7 illustrates an architecture of a conventional information processor.

The information processor is constructed of three units, i.e., an instruction control unit (I unit), a main storage unit (S unit) and an arithmetic processing unit (E unit).

Herein, the instruction control unit (I unit) sequentially executes a step (1) of reading an instruction address expressed by program status words, a step (2) of effecting an address translation of the instruction address, a step (3) of reading the instruction on the basis of the address after being translated, a step (4) of decoding the thus read instruction and translating it into commands processable by the arithmetic processing unit (E unit) and a step (5) of notifying the arithmetic processing unit (E unit) of the commands.

Hereat, step (4) includes a step of discriminating a microprogram for arithmetically controlling the instruction and detecting an entry address of this microprogram and also a step of discriminating operands required for the relevant instruction and detecting identification data of an operand register for storing the operands. Further the instruction control unit (I unit) creates a command to which the entry address detected in step (4) and the operand register identification data are added. Then, the instruction control unit (I unit) notifies the arithmetic processing unit (E unit) of the created command.

The arithmetic processing unit (E unit) has a microprogram storage (CS) for storing the microprogram, a result register part and an arithmetic executing part. The arithmetic execution part reads the entry address of the microprogram from the command notified by the instruction control unit (I unit) and the operand register identification data. Next, the arithmetic processing unit (E unit) has an access to the microprogram storage (CS) on the basis of the entry address and reads the microprogram. The arithmetic processing unit (E unit), at the same time, reads the operands needed for executing the relevant command out of the operand register indicated by the operand register identification data. Then, the arithmetic processing unit (E unit) effects the arithmetic processing of the operand in accordance with the microprogram, stores the result register with an arithmetic result and, at the same time, writes the arithmetic result to the main storage unit (S unit).

Herein, there is a method of performing pipeline control of the information processor in an attempt to speed up the processing. FIG. 8 illustrates a flow of processing based on this pipeline control.

In FIG. 8, the reference symbol B (Buffer status) designates a reading status of the operand and the microprogram, and the symbol E (Execution status) represents a command execution status (Arithmetic status). Further symbol W (Write status) indicates a write status of the execution result. The processing in each status is conducted normally at a one-machine cycle.

On the other hand, as shown in FIG. 9, the processing in the command execution status is effected at a multi-machine cycle. In this case, the instruction control unit (I unit) recognizes this when decoding the relevant instruction and performs the control to hold the command execution status of the relevant instruction. Then, the arithmetic processing unit (E unit), when finishing the execution of the relevant command, transmits an end-of-arithmetic signal (EEND) to the instruction control unit (I unit). The instruction control unit (I unit), on receiving the end-of-arithmetic signal (EEND), permits a start of arithmetic processing of the next command.

The following is an explanation of the instruction retry in terms of the RAS function. When detecting the hard error during the instruction processing, the instruction control unit (I unit) inhibits a write of the arithmetic result or the processing result with respect to the instruction concerned and, at the same time, cancels the next instruction which has already been inputted. Then, the instruction control unit (I unit) causes the arithmetic processing unit (E unit) to reexecute the above instruction, thus trying a normal end. This instruction retry prevents the system failure due to the hard error.

By the way, the above-mentioned instruction retry method is conducted based on the instruction read by the instruction control unit (I unit). If the single instruction is divided into a plurality of commands, e.g., three pieces of commands and then executed, and when detecting an error during an execution of the third command, a status is such that execution results of the first and second commands have already been written to the result register and the main storage unit (S unit) at that point. The status is further such that the value of the operand register has also been rewritten. It is impossible to reexecute the instruction comprising these three commands.

SUMMARY OF THE INVENTION

The present invention aims at widening an applied range of a retry function in an information processor for performing the processing under pipeline control and improving a reliability, an availability and a serviceability of the information processor.

Given hereinbelow is a brief explanation of a method of and an apparatus for controlling a command retry.

Command Retry Control Method

An instruction control step of reading is executed, when receiving an indication to execute a program from a management system for maintaining and managing an information processor for executing pipeline processing, the program in accordance with the indication, translating an instruction contained in this program into a command form and inputting the commands. Then, the information processor carries out an arithmetic executing step of sequentially executing the commands inputted in the instruction control step. At this time, the information processor executes an error detecting step of determining whether or not an error occurs during the execution of the arithmetic executing step.

When detecting the occurrence of an error in the error detecting step, the information processor carries out an operand checking step of analyzing the operand to be referred when executing the command and checking whether or not a value of the operand is a normal value. Herein, if the operand value is the normal value, the information processor begins a command stopping step of stopping the input of a command to be executed next to the foregoing command. Herein, the command retry control method of the present invention includes a step of issuing, when the execution of the command has been normally finished, an end-of-execution notice of the command. A next command is inputted after issuing this end-of-execution notice. With this processing, it is possible to stop inputting the next command by inhibiting the issuance of the end-of-execution notice.

After executing the command stopping step, the information processor carries out a retry control step for reexecuting the command in which the error occurs. With the execution of this retry control step, when normally finishing the reexecution of the command, the information processor executes a command inputting step of resuming the inputting of the next command. That is, the end-of-execution notice of the command is issued, thereby executing the instruction control step and inputting the next command.

Further, if the error reoccurs in the middle of executing the retry control step, the information processor carries out an error notifying step of notifying the management system of the occurrence of an error, Moreover, the information processor, before executing the retry control step, carries out a step of determining whether or not the end-of-execution notice has already been issued. If the end-of-execution notice has not yet been issued, the information processor carries out a step of reexecuting the command.

Further, the retry control step may include a step of counting the number of reexecutions of the command. In this case, the information processor determines whether or not the number of executions is less than a specified value with reference to the number of reexecutions which is counted in the retry counting step before performing the reexecution processing of the command. Then, the information processor may perform the reexecution processing of the command when the number of reexecutions is less than the specified value.

According to this method, the information processor is capable of effecting the retry processing on the command basis when the error occurs.

Next, a command retry control apparatus of the present invention will be explained.

Command Retry Control Apparatus

In the command retry control apparatus of this invention, an error detecting unit monitors a status of the command execution by an arithmetic execution unit. Then, the error detecting unit, when detecting a hard error during an execution of the command by the arithmetic execution part, notifies a retry control unit of the occurrence of an error.

The retry control unit determines whether or not the command is possible of retry, i.e., whether or not the end-of-execution notice of the command has already been sent to an instruction control unit.

Herein if the end-of-execution notice is not yet sent to the instruction control unit, the retry control unit starts up an operand check unit.

The operand check unit determines whether or not a value of the operand is altered by discriminating the operand to be referred when executing the command. Specifically, the operand check unit checks whether or not the operand value is rewritten, erased and so on with reference to operand data on the basis of an operand address contained in the command. Herein, if the operand value is normal, the retry control unit notifies the arithmetic execution unit of the command to effect the reexecution thereof.

Further, the operand check unit notifies the instruction control unit of the command error and the reexecution thereof. The instruction control unit receiving this notice does not give the error notice to the management system but stops inputting the next command to the arithmetic execution unit. Simultaneously with this processing, the retry control unit starts up the error detecting unit to monitor the reexecution of the command.

Then, the arithmetic execution unit, when the execution of the command is normally finished, transmits the end-of-execution notice to the instruction control unit.

At this time, the instruction control unit cancels a standby status for the next command and inputs the next command to the arithmetic execution unit.

Further, if the error is produced during the reexecution of the command, the retry control unit notifies the instruction control unit of the command being unexecutable.

The instruction control unit notifies the management system of the occurrence of error upon receiving the above notice.

Note that the retry control unit, in the case of providing a retry counter, repeatedly performs the reexecution processing till a counter value of the retry counter reaches a specified value or till the execution of the command is normally finished.

When a single instruction is divided into a plurality of commands and thus executed, the command retry control apparatus according to the present invention is capable of, if the hard error is caused, retrying only the command in which the hard error occurs.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

The present invention will hereafter be discussed by way of embodiments with reference to the drawings.

(Embodiment 1)

Figure 1:
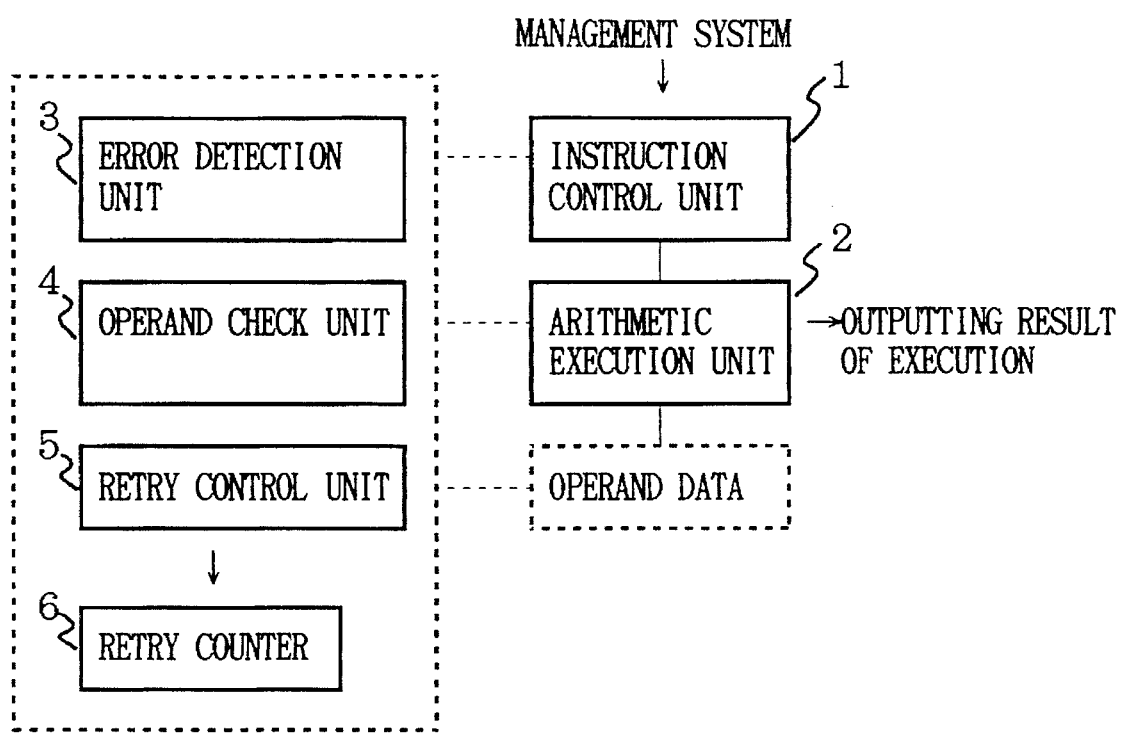
FIG. 1 is a view illustrating a command retry control apparatus in a first embodiment.

FIG. 1 illustrates a construction of a command retry control apparatus in accordance with the present embodiment 1.

This command retry control apparatus is applied to an information processor for performing pipeline processing by translating an instruction expressed by program status words into processable commands. The command retry control apparatus includes an instruction control unit 1. The instruction control unit 1 reads a program in accordance with a command issued from a management system for managing the information processor and translates the instruction contained in this program into commands in such a form as to be processable by the information processor.

Besides, the command retry control apparatus includes an arithmetic execution unit 2, an error detection unit 3, an operand check unit 4 and a retry control unit 5.

The instruction control unit 1 incorporates a function to read the program in accordance with a command of the management system and a function to translate the instruction expressed by the program status words into commands in such a form as to be processable by the arithmetic execution unit 2. This command comprises e.g., a microprogram address corresponding to an execution of the instruction and an address of operand data to be referred during the execution of the instruction.

The arithmetic execution unit 2 refers to the operand data in accordance with the commands translated by the instruction control unit 1 and performs the arithmetic processing by use of this operand value. Further, the arithmetic execution unit 2 incorporates a function to notify the instruction control unit 1 of an end of the execution and a function to write the result of the execution (arithmetic result) to a result register and a main storage unit. Further, in addition, the arithmetic execution unit 2 has a function to issue an end-of-execution notice to the instruction control unit 1 when finishing the execution of the command. Correspondingly, the instruction control unit 1 has a function to, after receiving the end-of-execution notice from the arithmetic execution unit 2, input the next command to the arithmetic execution unit 2.

The error detection unit 3 incorporates a function to check whether or not a hard error occurs during the execution of the command by the arithmetic execution unit 2.

The operand check unit 4 discriminates the operand to be referred during the execution of this command by analyzing the command which has been executed by the arithmetic execution unit 2 when the error occurred. Then, the operand check unit 4 has a function to check whether or not the value of the operand is altered (rewritten, erased and so on).

The retry control unit 5 incorporates a function to control operations of the arithmetic execution unit 2, the error detection unit 3 and the operand check unit 4. Specifically, the retry control unit 5 starts up the operand check unit 4 to discriminate a normality of the operand when the error detection unit 3 detects the error. Subsequently, the retry control unit 5 has a function to, if the operand is normal, issue a command of reexecution to the arithmetic execution unit 2. Further, the retry control unit 5, on the occasion of reexecuting the command, notifies the command control unit 1 of the error occurrence and the reexecution of the command. At this time, the instruction control unit 1 stops inputting the next command to the arithmetic execution unit 2 (into a standby status) and, simultaneously, inhibits the outputting (writing to the result register and the main storage unit) of the result of the execution. Then, the command control unit 1, upon receiving an end-of-execution notice from the retry control unit 5, resumes the inputting of the next command.

On the other hand, when an error reoccurs during the reexecution thereof, and if the reexecution is not normally ended the retry control unit 5 gives the instruction control unit 1 a notice saying that the command is unexecutable. At this time, the instruction control unit 1 notifies the management system of the occurrence of the error.

Besides, the retry control unit 5 incorporates a function to, when the error detection unit 3 detects the occurrence of the error, determine whether or not the end-of-execution notice of the command has already been issued. Then, the retry control unit 5, if the end-of-execution notice is not yet issued, controls the reexecution processing of the command. On the other hand, the retry control unit 5, if the end-of-execution notice has already been issued, notifies the management system of the command being unexecutable via the instruction control unit 1.

Further, the retry control unit 5 includes a retry counter for counting the number of reexecutions of the command, and the retry processing may be repeatedly carried out till a value of the retry counter reaches a specified value.

Note that each command in this embodiment 1 is to be divided into such commands as to make only one reference to the operand data beforehand.

Hereinbelow, the operation of the present embodiment 1 will be explained.

The error detection unit 3 detects the hard error during the execution of the command by the arithmetic execution unit 2. Hereat, the retry control unit 5 determines whether or not the command is possible for retry. That is, the retry control unit 5 checks whether or not the arithmetic execution unit 2 issues the end-of-execution notice to the instruction control unit 1.

Hereat, if the end-of-execution notice is not issued, the retry control unit 5 starts up the operand check unit 4.

The operand check unit 4 discriminates the operand to be referred when executing the command. Then, the retry control unit 5 has the operand check unit 4 to check whether or not the value of the operand is altered (rewritten, erased, etc.). Specifically, the operand check unit 4 refers to the operand data on the basis of the operand address contained in the command and thus checks whether or not the operand value is rewritten, erased and so forth. Herein, if the operand value is normal, the retry control unit 5 notifies the arithmetic execution unit 2 to retry the command.

Further, the operand check unit 4 notifies the instruction control unit 1 of the error of command and the reexecution thereof. The command control unit 1 receiving this notice does not notify the management system of the error but stops inputting the next command to the arithmetic execution unit 2.

The retry control unit 5 starts up the error detection unit 3 and monitors whether the command is normally retried or not. Then, the retry control unit 5, if the command is normally executed, transmits the end-of-execution notice to the command control unit 1.

At this time, the command control unit 1 cancels the standby status of the next command and inputs the next command to the arithmetic execution unit 2.

Further, the retry control unit 5, when the error occurs during the reexecution of the command, notifies the instruction control unit 1 of the command being unexecutable. The instruction control unit 1 receiving this notice notifies the management system of the occurrence of the error.

Hereinafter, a more specific embodiment of the present invention will be discussed.

(Embodiment 2)

The embodiment of the present invention will be described with reference to the drawings.

Figure 2:
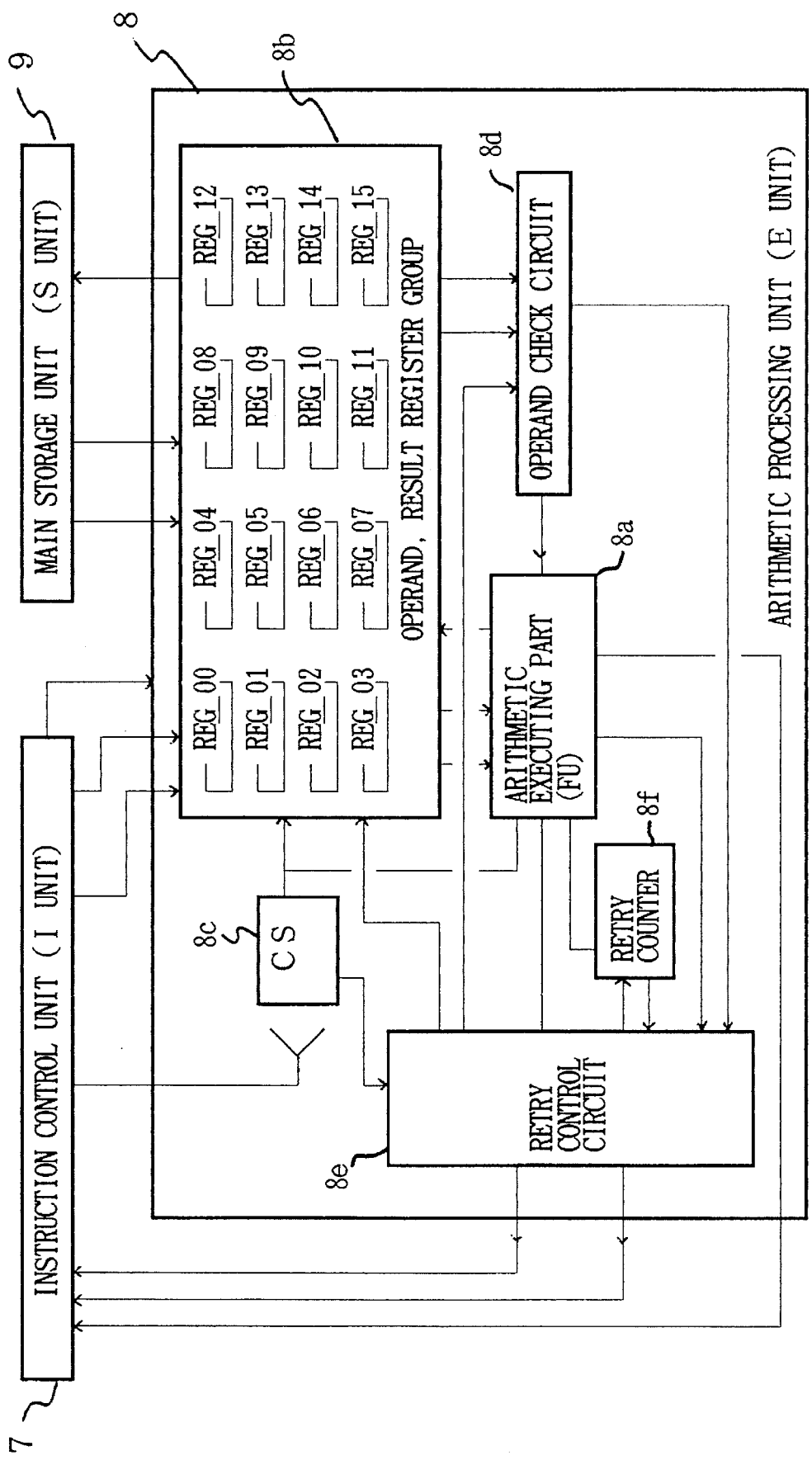
FIG. 2 is a schematic block diagram showing an architecture of an information processor in a second embodiment.

FIG. 2 is a schematic block diagram showing an architecture of the information processor in this embodiment.

The present information processor is an apparatus for executing the instruction in accordance with the microprogram. This information processor comprises an instruction control unit (I unit) 7, an arithmetic processing unit (E unit) 8 and a main storage unit (S unit) 9. An operating system (unillustrated) manages these units.

The instruction control unit 7 has a function to control the operation of the arithmetic processing unit 8 in accordance with an indication given from the operating system. The instruction control unit 7 has, more specifically, a function to read the program indicated by the operating system and a function to translate the instruction expressed by the program status words into commands processable by the arithmetic processing unit 8.

The arithmetic processing unit 8 incorporates a function to execute the commands outputted from the instruction control unit 7 and a function to write a result of execution to the main storage unit 9.

Further, the arithmetic processing unit 8 includes a control storage (CS) 8c for storing the microprogram, an arithmetic execution part (FU) 8a for executing the commands in accordance with the microprogram and a register group 8b having an operand register for storing the operand data and a plurality of result registers for storing the arithmetic results of the arithmetic execution part (FU) 8a. The arithmetic processing unit 8 further includes an operand check circuit 8d for checking whether or not a value of the operand register is normal when the error occurs, a retry control circuit 8e for controlling the reexecution processing of the command when the error occurs and a retry counter 8f for counting the number of retries of the respective commands.

The instruction control unit (I unit) 7 analyzes the instruction expressed by the program status words and creates a command containing an operand register's number and an entry address of the microprogram for effecting the arithmetic control of this instruction.

Then, the control storage (CS) 8c is notified of the above command. The control storage (CS) 8c reads the microprogram for performing the arithmetic control of the above command on the basis of the microprogram entry address contained in the command and notifies the arithmetic execution part (FU) 8a of the microprogram.

The arithmetic execution part (FU) 8a executes the above command with reference to the operand register in accordance with the microprogram. Then, the arithmetic execution part (FU) 8a writes a result of execution to a result register designated by the microprogram.

The result register writes the result of execution to the main storage unit (S unit) 9.

Further, the control storage (CS) 8c, when reading the microprogram for effecting the arithmetic control of the command, notifies the arithmetic execution part (FU) 8a of this microprogram.

Further, the control storage (CS) 8c, if a hard error is caused during an execution of the command, recognizes that this command is possible of retry, i.e., that the arithmetic result is not yet written to the result register or the main storage unit (S unit) 9, and that the arithmetic execution part (FU) 8a does not yet send an end-of-execution notice to the instruction control unit (I unit) 7. The control storage (CS) 8c starts up the retry control circuit 8e to perform the retry processing of the relevant command.

Hereinafter, the processing steps of the present information processor will be explained.

Figure 3:
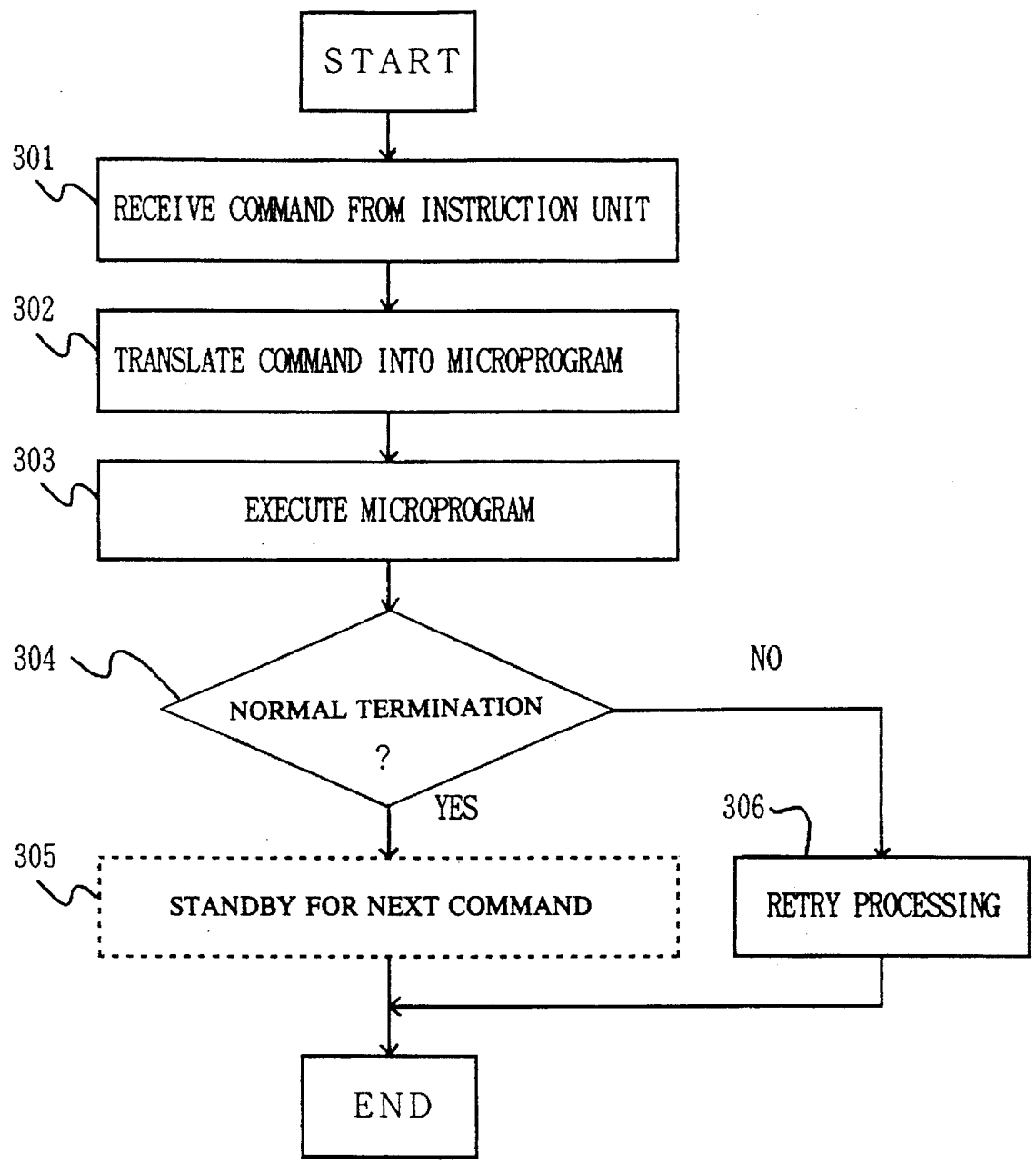
FIG. 3 is a flowchart schema showing command executing procedures.

FIG. 3 is a flowchart schema showing command execution procedures of the present information processor.

The instruction control unit (I unit) 7 reads and analyzes the instruction expressed by the program status words in accordance with an indication given from the operating system. Then, the instruction control unit (I unit) 7 creates a command containing an operand register's number and an entry address of the microprogram for effecting the arithmetic control of this instruction. The instruction control unit (I unit) 7 then notifies the arithmetic processing unit (E unit) 8 of this command (step 301).

The arithmetic processing unit (E unit) 8, upon receiving the command from the instruction control unit (I unit) 7, transfers this command to the control storage (CS) 8c.

The control storage (CS) 8c extracts the entry address of the microprogram from the relevant command. The control storage (CS) 8c then reads the microprogram for effecting the arithmetic control of the relevant command on the basis of this entry address and transfers it to the arithmetic execution part (FU) 8a (step 302).

The arithmetic execution part (FU) 8a executes the arithmetic processing in accordance with the microprogram (step 303).

At this time, the control storage (CS) 8c determines whether or not the hard error occurs by monitoring a status of the arithmetic execution part (FU) 8a (step 304).

Herein, if the hard error occurs, the retry processing is started (step 306). This retry processing will hereinafter be explained in greater detail.

When the command is normally executed, the arithmetic execution part (FU) 8a writes an arithmetic result to the result register designated by the microprogram among the result registers of the register group 8b. The result register outputs the relevant arithmetic result to the main storage unit (S unit) 9. The main storage unit (S unit) 9 stores the arithmetic result outputted from the result register.

Note that the control storage (CS) 8c, the retry control circuit 8e and the arithmetic execution part (FU) 8a are in the standby status for the next command when finishing the processing relative to the above command (step 305).

Figure 4:
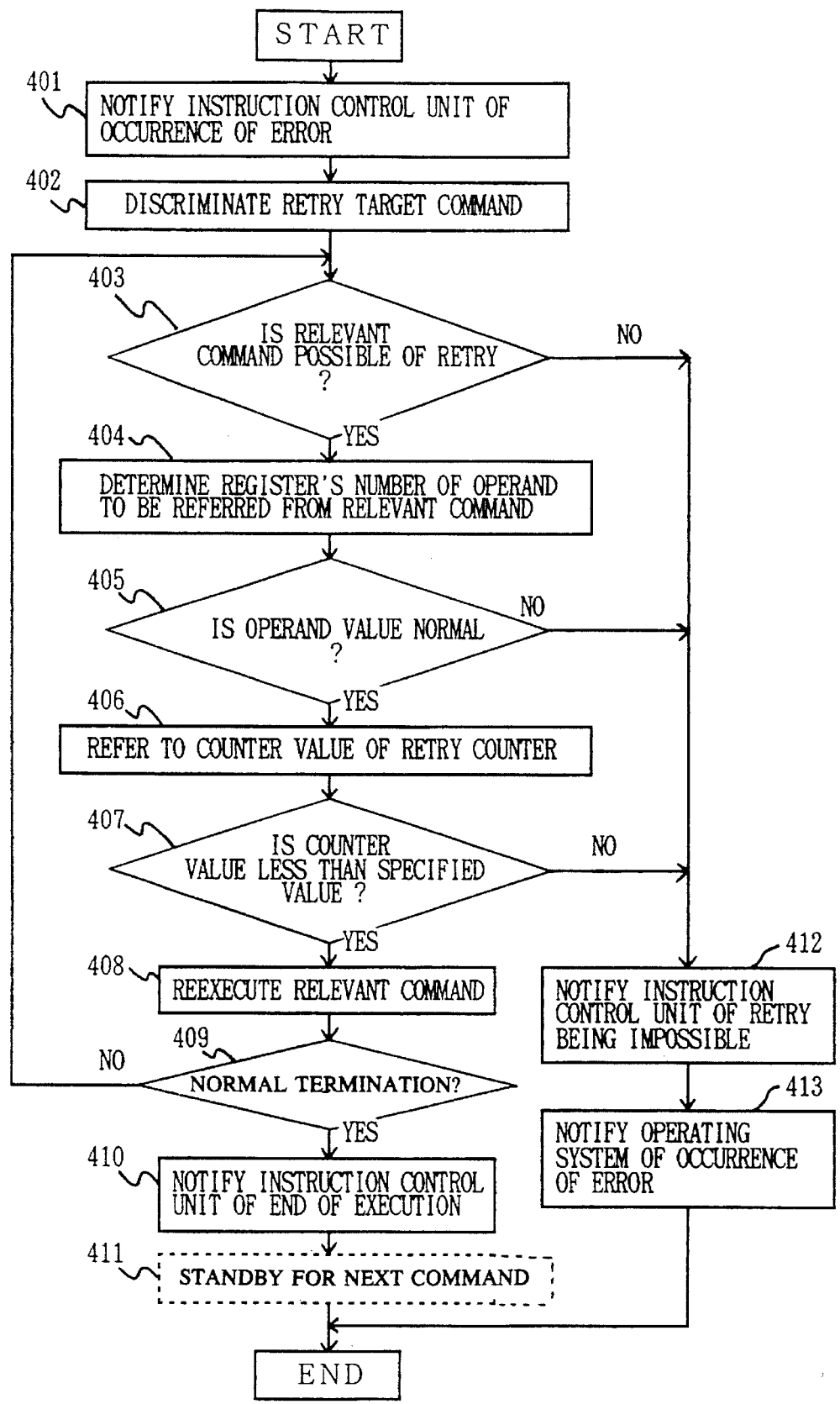
FIG. 4 is a flowchart schema showing command retry procedures.

Herein, the retry processing procedures of step 306 in FIG. 3 will be explained in conjunction with FIG. 4.

The arithmetic execution part (FU) 8a notifies the instruction control unit (I unit) 7 and the retry control circuit 8e of the occurrence of an error (step 401). Hereat, the instruction control unit (I unit) 7 issues a standby instruction to each part of the arithmetic processing unit (E unit) 8 and, at the same time stops the command notification with respect to the arithmetic processing unit (E unit) 8.

The retry control circuit 8e, on the basis of the notice from the control storage (CS) 8c, recognizes a retry target command, i.e., the command which was being executed when the error occurred (step 402). Then, the retry control circuit 8e determines whether or not the result of the execution of the relevant command has already been written to the result register and whether or not the arithmetic execution part (FU) 8a has already given the end-of-execution notice to the instruction control unit (I unit) 7 (step 403).

Herein, if the execution result is not yet written to the result register, and when the end-of-execution notice is not given to the instruction control unit (I unit) 7, a register's number of the operand to be referred is extracted from the microprogram for performing the arithmetic control of the relevant command, and the operand check circuit 8d is notified of this operand register's number (step 404).

The operand check circuit 8d checks whether or not an operand value is altered due to rewriting, erasing and the like with reference to a value of the operand register corresponding to the relevant operand register's number (step 405). Herein, when the operand value is normal, the retry control circuit is notified of this effect.

The retry control circuit 8e, when recognizing the normality of the operand, refers to a counter value of the retry counter 8f and determines whether or not the counter value is less than a specified value (step 406 and step 407).

If the counter value is less than the specified value, the retry control circuit 8e sends a retry processing notice to the instruction control unit (I unit) 7 and, at the same time, indicates the arithmetic execution part (FU) 8a to reexecute the relevant command (step 408).

Herein, if the arithmetic execution part normally finishes reexecuting the relevant command, the retry control circuit 8e notifies the instruction control unit (I unit) 7 of an end of the execution (step 409 and step 410). Hereat, the instruction control unit (I unit) 7 indicates to each part of the arithmetic processing unit (E unit) 8 to resume the processing and, simultaneously, transmits the next command to the arithmetic processing unit (E unit) 8.

The arithmetic processing unit (E unit) 8 is in the standby status for the next command from the instruction control unit (I unit) 7 (step 411).

Note that if the reexecution of the relevant command does not normally come to an end (if the error reoccurs) in step 409 described above, the retry control circuit 8e increments a value of the retry counter 8f, and the processing after step 403 inclusive is repeatedly performed.

Further, in step 403 given above, if the execution result of the relevant command has already been written to the result register or if the instruction control unit (I unit) 7 has already been notified of the end of the execution of the relevant command, the retry control circuit 8e notifies the instruction control unit (I unit) 7 to the effect that the relevant command is unexecutable (step 412). The instruction control unit (I unit) 7 notifies the operating system of the occurrence of error for the first time at this point (step 413).

Further, if the operand value is altered in step 405 described above, or if the counter value is equal to the specified value in step 407, the same processing of steps 412 and 413 is to be carried out.

Figure 5:
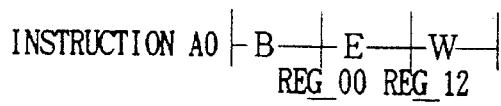
FIG. 5 is a timing chart (1) showing retry processing procedures.
Figure 5:
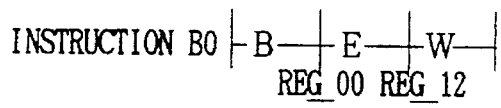
Figure 5:
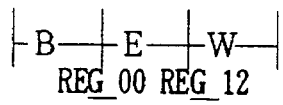
Figure 5:
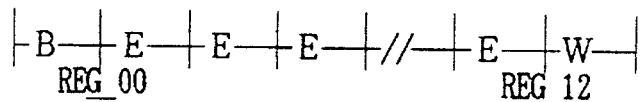

As discussed above, the retry in this embodiment can be performed not on the instruction basis but on the command basis, and, therefore, an applied range of the retry processing is widened. That is, when the instruction control unit (I unit) 7 translates the instruction into the command form, there exists a case where the single instruction is translated into the plurality of commands. Even if the error occurs during an execution of a certain command, only this command may be retried (see FIG. 5).

Figure 6:
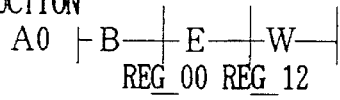
FIG. 6 is a timing chart (2) showing the retry processing procedures.
Figure 6:
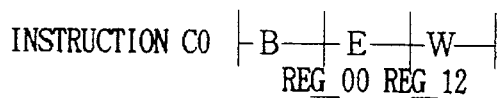
Figure 6:
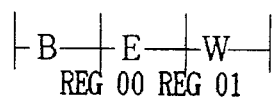
Figure 6:
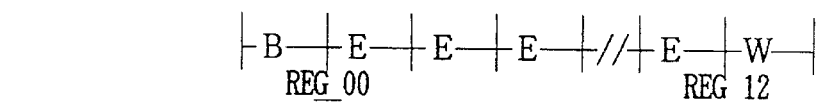
Figure 6:
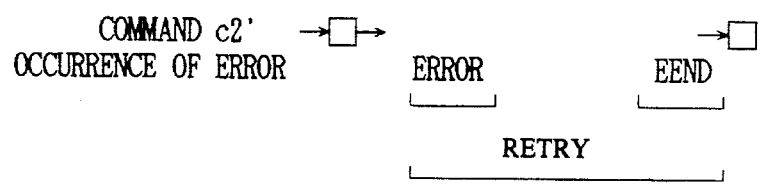
Figure 6:
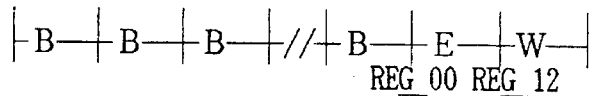
Figure 7:
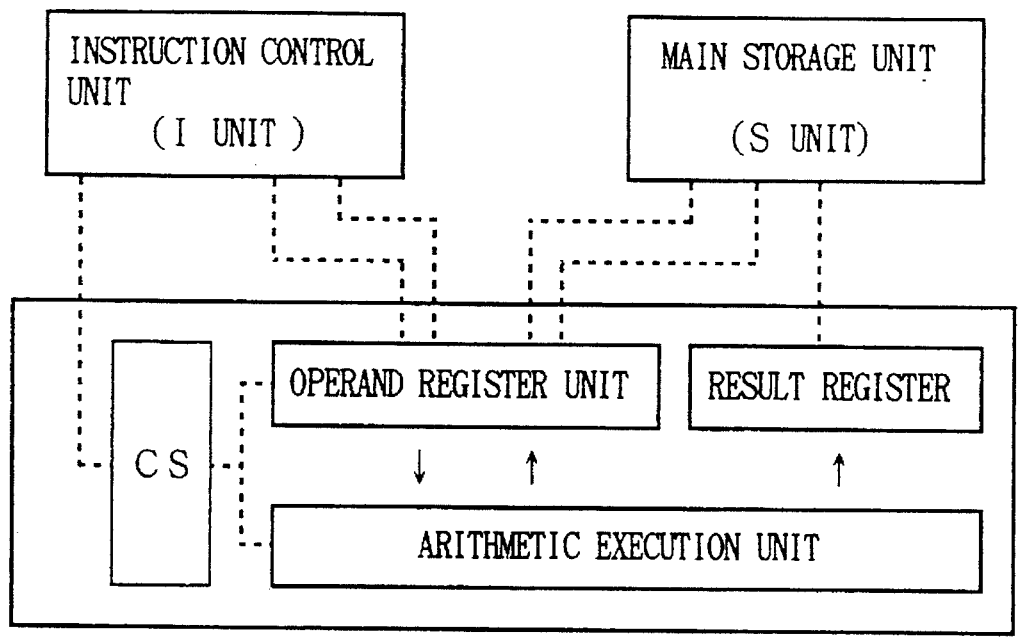
FIG. 7 is a block diagram illustrating an architecture of a conventional information processor.
Figure 8:
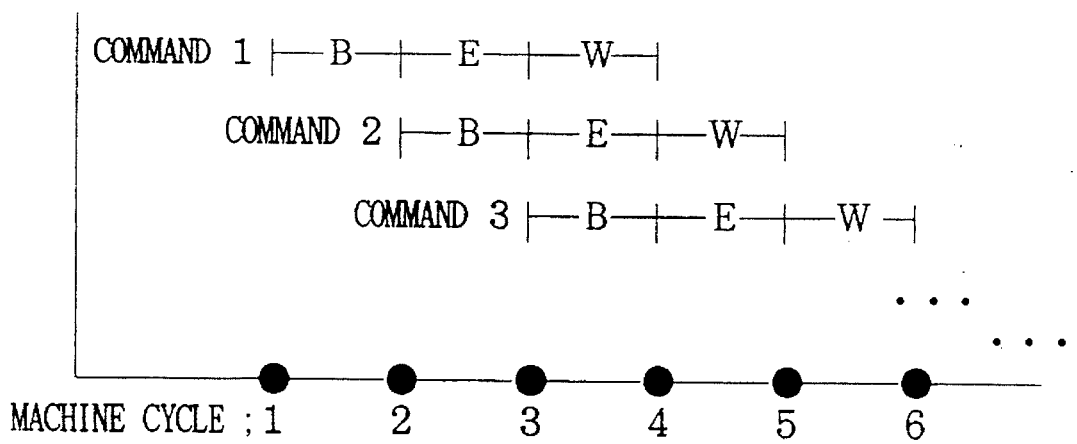
FIG. 8 is a timing chart (1) showing a flow of pipeline control.
Figure 9:
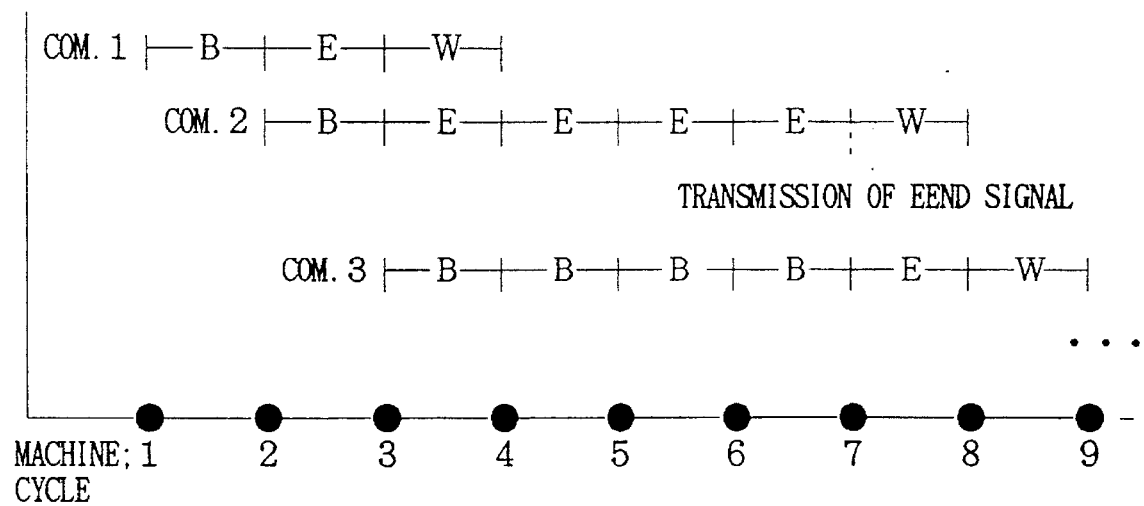
FIG. 9 is a timing chart (2) showing the flow of pipeline control.

Moreover, in accordance with this embodiment, such a command as to make a plurality of references to the operand register is divided into such subcommands as to respectively make only one reference to the operand register, and the subcommands are to be executed. With this arrangement, even if the error occurs during the execution of the subcommand, only this subcommand can be retried (see FIG. 6).

From the foregoing, in accordance with this embodiment 2, the information processor, when the hard error is produced during the execution of each of the plurality of commands into which the single instruction is divided, is capable of retrying only the command in which the hard error occurs. Moreover, such a command as to make the reference to the operand data a plurality of times is divided into such subcommands as to respectively make only one reference to the operand data. With this arrangement, even if the hard error is caused during the execution thereof, only that command can be reexecuted. Accordingly, the reliability, the availability and serviceability of the information processor can be improved.

It is apparent that, in this invention a wide range of different working modes can be formed based on the invention without deviating from the spirit and scope of the invention. This invention is not restricted by its specific working modes except being limited by the appended claims.

What is claimed is:

1. A method of controlling a command retry for executing pipeline processing in an information processor maintained and managed by a management system, the method comprising:

an instruction control step of reading, when receiving an indication to execute a program from the management system for maintaining and managing the information processor, the program in accordance with the indication, translating an instruction contained in the program into a plurality of commands in such a form as to be processable by the information processor and inputting said plurality commands;

an arithmetic executing step of sequentially executing said plurality of commands inputted in said instruction control step;

an error detecting step of determining whether an error occurs in a middle of executing one of said plurality of commands in said arithmetic executing step;

an operand checking step of analyzing, when detecting the occurrence of the error in said one command in said error detecting step, the operand to be referred when executing said one command and checking whether a value of the operand is a normal value;

a command stopping step of stopping input of another one of said plurality of commands to be executed next to said one command when the value of the operand is the normal value;

a retry control step of reexecuting said one command;

a command inputting step of resuming the inputting of said another one of said plurality of commands to be executed next to said one command when normally finishing the reexecution of said one command; and an error notifying step of giving, when the error reoccurs during the reexecution of said one command in said retry control step, a notice of the occurrence of the error to said managing system.

2. The method of controlling a command retry according to claim 1, wherein:

said arithmetic executing step comprises a step of outputting, when the execution of said one command has been normally finished, an end-of-execution notice of said one command; and said instruction control step comprises a step of inputting, after receiving the end-of-execution notice, said another one of said plurality of commands to be executed next to said one command.

3. The method of controlling a command retry according to claim 2, wherein said retry control step comprises:

a step of determining whether the end-of-execution notice of said one command is outputted when detecting the occurrence of error in said error detecting step; and a step of reexecuting said one command if the end-of-execution notice is not outputted.

4. The method of controlling a command retry according to claim 1, wherein said retry control step comprises:

a step of counting a number of reexecutions of said command; and a step of determining whether the number of reexecutions is less than a specified value before performing the reexecution processing of said one command; and a step of reexecuting said one command when the number of reexecutions is less than the specified value.

5. An apparatus for controlling a command retry in an information processor for executing pipeline processing maintained and managed by a management system, said apparatus comprising:

instruction control means for reading, when receiving an indication to execute a program from the management system for maintaining and managing the information processor, the program in accordance with the indication, translating an instruction contained in the program into a plurality of commands in such a form as to be processable by said information processor and inputting said plurality of commands to the information processor;

arithmetic executing means for sequentially executing said plurality of commands inputted by said instruction control means;

error detecting means for determining whether an error occurs during the execution of one of said plurality of commands performed by said arithmetic executing means;

operand checking means for analyzing, when said error detecting means detects the occurrence of the error, the operand to be referred when executing said one command and checking whether a value of the operand is a normal value; and retry control means for causing, when the value of the operand is the normal value, said arithmetic executing means to reexecute said one command by stopping input of another one of said plurality of commands to be executed next to said one command, resuming the inputting of said another one of said plurality of commands to be executed next to said command and notifying the management system of the occurrence of the error when the error reoccurs during the reexecution of said command.

6. The apparatus for controlling a command retry according to claim 5, wherein:

said arithmetic executing means outputs, when the execution of said one command has been normally finished, an end-of-execution notice of said one command; and said instruction control means inputs, after receiving the end-of-execution notice, said another one of said plurality of commands to be executed next to said one command.

7. The apparatus for controlling a command retry according to claim 6, wherein said retry control means determines whether the end-of-execution notice of said one command is outputted in response to said error detecting means detecting the occurrence of the error, and causes said arithmetic executing means to reexecute said one command if the end-of-execution notice is not outputted.

8. The apparatus for controlling a command retry according to claim 5, wherein said retry control means includes a retry counter for counting a number of reexecutions of said command, determines whether a counter value of said retry counter is less than a specified value before performing the reexecution processing of said one command and causes said arithmetic executing means to reexecute said one command when the counter value is less than the specified value.

\* \* \* \* \*